United States Patent [19]

Verhoeven

[11] 3,793,478

[45] Feb. 19, 1974

[54] LINE-SEQUENTIAL COLOUR TELEVISION TRANSMISSION SYSTEM AND SIGNAL GENERATOR AND SIGNAL RECEIVER FOR SAID SYSTEM

[75] Inventor: Leonardus Adrianus Johannes Verhoeven, Emmasingel, Eindhoven, Netherlands

[73] Assignee: U.S. Philips Corporation, New York, N.Y.

[22] Filed: July 19, 1972

[21] Appl. No.: 273,345

[30] Foreign Application Priority Data

July 31, 1971 Netherlands ........................ 7110625

[52] U.S. Cl. ............................ 178/5.2 R, 178/5.4 R

[51] Int. Cl. ................................................ H04r 9/40

[58] Field of Search 178/5.2 R, 5.4 S, 5.4 C, 5.4 CD

[56] References Cited

UNITED STATES PATENTS 3,255,303 6/1966 Kihara ............................ 178/5.4 CD
2,811,578 10/1957 Rieke ............................... 178/5.2 R
3,290,431 12/1966 Tasso .................................. 178/5.4

*Primary Examiner*—Robert L. Richardson
*Attorney, Agent, or Firm*—Frank R. Trifari; Henry I. Steckler

[57] ABSTRACT

A line-sequential color television system in which a luminance signal and the low-frequency part of the luminance signal combined with a chrominance signal modulated on a subcarrier in angle and amplitude are alternately transmitted so as to improve the vertical definition and to obtain a favorable ratio of the information capacity of the system utilized by different signals.

9 Claims, 4 Drawing Figures

Figure 1:
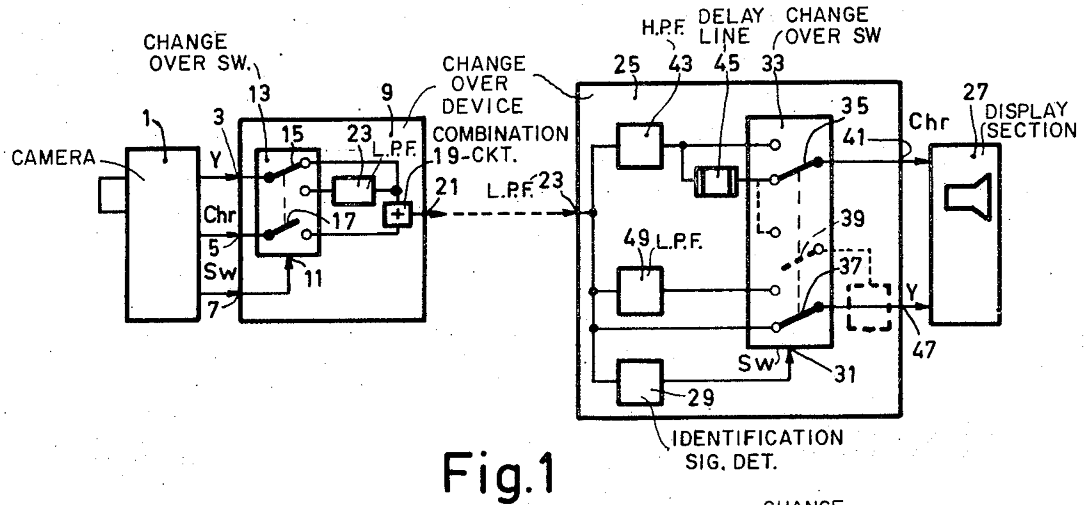

LINE-SEQUENTIAL COLOUR TELEVISION TRANSMISSION SYSTEM AND SIGNAL GENERATOR AND SIGNAL RECEIVER FOR SAID SYSTEM

The invention relates to a line-sequential colour television transmission system for transmitting from a signal generator to a signal receiver alternately luminance information during one line period and colour information during a subsequent line period.

A line-sequential colour television transmission system of the kind described above is known from U.S. Pat. No. 3,255,303 in which the colour information is transmitted as a combination of an I-signal in the low part of the pass band and a carrier-modulated Q-signal in the high part of the pass band of the system. In such a system the image quality of a transmitted image is detrimentally influenced by a reduction of the vertical definition which occurs as a result of the line-sequential transmission.

An object of the invention is to obviate this drawback.

To this end a line-sequential colour television transmission system of the kind described in the preamble according to the invention is characterized in that the transmission system includes means for transmitting during the said subsequent line period both the low-frequency part of the luminance information and the colour information which is modulated in angle and amplitude on a subcarrier and is brought as a chrominance signal in a frequency range above the said low-frequency part of the luminance information.

By transmitting at least the low-frequency part of the luminance signal during each line period there is no vertical definition reduction in the luminance signal. A vertical definition reduction in the colour information signal only is found to be much more acceptable and the slight disturbing influence thereof can be reduced further, if desired, by using, for example, a combination of colour information signals from successive line periods for the transmission.

A colour television transmission system according to the invention is particularly suitable for use in a colour videophone.

The invention will now be described with reference to several embodiments shown in the drawing.

Figure 2:
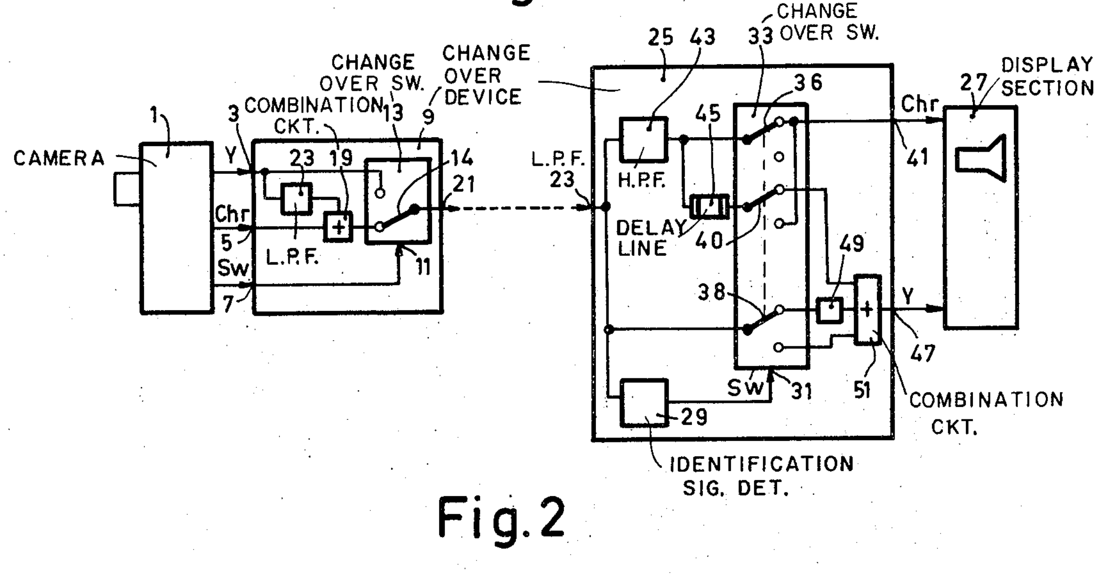
Figure 3A:
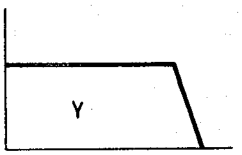

In the drawing:

FIG. 1 shows by way of a block diagram a transmission system according to the invention, FIG. 2 likewise shows by way of a block diagram a further embodiment of a transmission system according to the invention, FIGS. 3*a*, *b* show the frequency spectra of the information transmitted during two successive line periods.

In FIG. 1 a camera 1 applies a luminance signal Y to an input 3, a chrominance signal Chr with the complete colour information modulated on a subcarrier in angle and amplitude to an input 5 and a change-over signal $S_w$ to an input 7 of a change-over device 9.

The input 7 of the change-over device 9 is connected to a change-over signal input 11 of a change-over switch 13 which has a first contact 15 and a second contact 17.

In the position of the contacts 15 and 17 shown the first contact 15 connects the luminance signal input 3 directly to an input of a combination circuit 19 an output 21 of which is also the output of the change-over device 9. The second contact 17 interrupts a signal path from the chrominance signal input 5 to a further input of the combination circuit 19. Hence a luminance signal Y is produced at the output 21, which signal can occupy substantially the complete bandwidth of the transmission system as is shown in FIG. 3a.

Figure 3B:
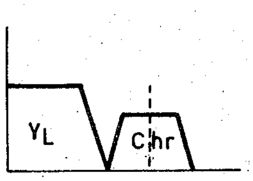

During the next line period the contacts 15 and 17 occupy the position not shown under the influence of the change-over signal $S_w$ and the luminance signal input 3 is connected through the first contact 15 and a lowpass filter 23 to the first-mentioned input of the combination circuit 19 which therefore only receives the portion of low frequencies $Y_L$ of the luminance signal Y. The second contact 17 applies the modulated subcarrier to the further input of the combination circuit 19 and a signal which includes the components of the low frequencies $Y_L$ of the luminance signal and the chrominance signal Chr as shown in FIG. 3*b* is applied to the output 21. The bandwidth of the system is now divided by the two signals $Y_L$ and Chr.

During each line period at least the part $Y_L$ of the luminance signal of the lowest frequencies determining the vertical definition is completely transmitted so that the vertical definition can be maintained when the correct steps are taken in case of reception, by means of a signal receiver, of a signal provided by the output 21 of the camera 1 serving as a signal generator and by change-over device 9.

The signal provided by output 21 is transmitted to an input 23 of a signal receiver constituted by a change-over device 25 and a display section 27. This transmission may be effected in a direct manner via a lead as is common practice in videophone installations for short distance connections or via electromagnetic waves which are propagated without conductors on which the signal to be transmitted is modulated, or in an indirect manner through a recording device such as, for example, a magnetophone in which the signal is to be further processed for recording and recovering.

The input 23 which is also an input of the change-over device 25 is connected to an identification signal detector 29 in which a signal is recovered which is representative of the switching condition of switch 13 and with the aid of which a change-over signal $S_w'$ is obtained which is applied to a switching signal input 31 of a switch 33. Switch 33 therefore always occupies a position which is adapted to the position of switch 13 in the signal generator.

Switch 33 has a first contact 35, a second contact 37 and may have a third contact 39 shown in broken lines in a receiver according to a further embodiment of the invention.

The first contact 35 is included in a signal path from the input 23 to a chrominance signal output 41 of the change-over circuit 25 which includes furthermore a highpass filter 43 connected to the input 23. A first input of the first contact 35 is connected to an output of this highpass filter 43 and a second input is connected through a delay circuit 45 having a delay of one line period. The output of the first contact 35 is connected to the chrominance signal output 41.

The second contact 37 is present in a signal path from the input 23 to a luminance signal output 47 of the change-over circuit 25. An output of the second contact 37 is connected to the luminance signal output 47, a first input thereof is connected through a lowpass filter 49 and a second input is connected directly to the input 23 of the change-over circuit 25.

In the position shown of switch 33 the signal received at the input 23, which signal only includes the luminance signal Y at the complete bandwidth is passed through the second contact 37 to the luminance signal output 47. The first contact 35 ensures that a chrominance signal written in during the previous line period in the delay circuit 25 is read out to the chrominance signal output 41.

In the position not shown of switch 33, which position occurs during the next line period when the chrominance signal Chr and the luminance signal portion of the low frequencies $Y_L$ are transmitted, the first contact 35 passes the chrominance signal obtained from the output of highpass filter 43 to the chrominance signal output 41 and the second contact 37 passes the portion of the luminance signal of the low frequencies $Y_L$ filtered through lowpass filter 49 to the output 47. If desired, the portion of the luminance signal of the high frequencies written in during the previous line period in the delay circuit 45 may also be passed on to the luminance signal output 47 through the broken-line signal path including the third contact 39.

During each line period a chrominance signal and a luminance signal are applied to the display device 27, which signals can be displayed in a suitable manner. Due to the circuit of the signal receiver adapted to the signal generator, no vertical definition of the luminance signal is lost. Furthermore a favourable ratio between the parts of time and bandwidth of the transmission system occupied by the chrominance signal and the luminance signal is obtained which is adapted to the importance of these signals for the formation of an image.

In FIG. 2 corresponding parts have the same reference numerals. The circuit of FIG. 2 differs from that of FIG. 1 at those areas where switch contacts and other parts of the circuit are present.

In the change-over circuit 9 of the signal generator switch 13 has only one contact 14 which can connect the output 21 to the luminance signal input 3 or to the output of the combination circuit 19 one input of which is connected through lowpass filter 23 to the luminance signal input 3 and the other input of which is connected to the chrominance signal input 5. In the position shown of switch 13 the part of the luminance signal of the low requencies $Y_L$ and the chrominance signal Chr are applied to the output 21 and in the position not shown the complete luminance signal Y is applied.

In the change-over circuit 25 of the signal receiver the change-over switch 33 has differently arranged and connected contacts. A first contact 36 connects the output of highpass filter 43 to the chrominance signal output 41 in the position shown and interrupts this signal path in the position not shown. A second contact 38 connects the input 23 to lowpass filter 49 in the position shown, which filter is furthermore connected to a combination circuit 51. In the position not shown the second contact 38 connects the input 23 directly to the combination circuit 51.

The third contact 40 connects the output of delay line 45 in the position shown to a third input of the combination circuit 51. In the position not shown the third contact 40 connects the output of the delay circuit 45 to the chrominance signal output 41.

In the position shown of switch 33 a chrominance signal is applied to the chrominance signal output 41 through the first contact 36 and a luminance signal portion is applied to the luminance signal output 47 through the second contact 38 and lowpass filter 49 with only the low frequencies and simultaneously with a luminance signal portion obtained through the third contact 40 from the delay circuit 45 with the high frequencies from the previous line period.

In the position not shown of switch 33 the chrominance signal output 41 receives from delay circuit 45 and through the third contact 40 a chrominance signal stored in said circuit during the previous line period while the luminance signal output 47 receives the complete luminance signal through the second contact 38.

Consequently continuously occurring luminance and chrominance signals are applied to the display device 27, which signals may be processed in known manner.

In the embodiments mentioned above some possibilities of mutual connection of different components are shown. It will be evident that different modifications with which the envisaged signal transmission can likewise be realized are possible in this respect.

The identification signal $S_w$ may be included in different manners in the luminance signal or in the chrominance signal. If desired, it may be detected in given cases at the receiver end after switch 33.

Although in the embodiments described only one delay circuit 45 is used in a particularly favourable circuit, for example, separate delay circuits may of course be used for alternately obtaining an additional chrominance signal and an additional luminance signal portion with the high frequencies during the line periods when the signals are not transmitted.

In the signal generator a camera was used as a signal source which may, of course, alternatively be a different signal source such as, for example, a flying spot scanner or a magnetophone provided that they supply the signals in the desired form.

Although switching in the chrominance signal in the given embodiments is effected at the area where this signal is already present in a modulated form, this may alternatively be effected, for example, in or before a modulator in which this signal is formed.

As will be evident the filters used in the circuits may alternatively be bandpass filters.

The most commonly used form of angle and amplitude modulation with which the colour information can be modulated on a subcarrier in the system described is quadrature modulation, but it is alternatively possible to use frequency and amplitude modulation of the subcarrier.

When a line-sequential colour television system is used it may be desirable in given cases such as, for example, in a videophone system to pass a signal relating to the possibility whether the connected receiver can display images in colour or not in colour to the signal generator. With reference to this signal the generator can then determine whether a transmission in colour or in black and white is to take place. Such a signal may be obtained, for example, from the identification signal.

What is claimed is:

1. A line-sequential colour television transmission system for transmitting from a signal generator to a signal receiver alternatively luminance information during one line period and colour information during a subsequent line period, characterized in that the transmission system includes means for transmitting during the said subsequent line period both the low-frequency part of the luminance information and the colour information which is modulated in angle and amplitude on a subcarrier and is brought as a chrominance signal in a frequency range above the said low-frequency part of the luminance information.

2. A signal generator for a line-sequential colour television system as claimed in claim 1.

3. A signal generator for a line-sequential colour television system as claimed in claim 2, characterized in that it includes a change-over device having a luminance signal input, a chrominance signal input and an output which is coupled through a switch and luminance lowpass filter to the lumi-nance signal input and through a switch to the chrominance signal input.

4. A signal generator as claimed in claim 3, characterized in that the change-over device includes a combination circuit a first input of which is coupled to the luminance signal supply, a second input is coupled to the chrominance signal supply and an output is coupled through a switch to the output of the change-over device.

5. A signal receiver for a line-sequential colour television system as claimed in claim 1.

6. A signal receiver for a line-sequential system as claimed in claim 5, characterized in that it includes a change-over device having an input, a luminance signal output and a chrominance signal output, while a signal path between the input and the chrominance signal output includes a high-pass filter, a delay circuit and a switch and a signal path between the input and the luminance signal input includes a lowpass filter and a switch.

7. A signal receiver as claimed in claim 6, characterized in that the luminance signal output is also coupled through a switch to an output of the delay circuit.

8 A circuit for transmitting luminance and chrominance components of a line scanned color television signal, said circuit comprising first means for transmitting said luminance component during alternate line periods, and second means coupled to said first transmitting means for transmitting a combination signal comprising frequency transposed chrominance component and a low frequency portion of said luminance component during alternate line periods alternating with the luminance transmission line periods.

9. A circuit comprising input means for receiving a line scanned color television signal having a full bandwidth luminance component transmitted during alternate line periods and a combination signal comprising a bandwidth limited luminance component and a frequency transposed chrominance component transmitted during alternate line periods alternating with the luminance transmission line periods, first output means coupled to said input means for alternately supply said chrominance component and said chrominance component delayed by one line period, and second output means coupled to said input means for alternately supplying said full bandwidth luminance component and said bandwidth limited luminance component.

* * * * *